United States Patent
Jia et al.

(10) Patent No.: US 12,004,095 B2
(45) Date of Patent: Jun. 4, 2024

(54) COMMUNICATION METHOD AND COMMUNICATIONS DEVICE

(71) Applicant: Huawei Technologies Co., Ltd., Shenzhen (CN)

(72) Inventors: Qiong Jia, Shanghai (CN); Jun Zhu, Shenzhen (CN); Ji Wu, Shanghai (CN); Jin Liu, Shenzhen (CN); Jun Luo, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/875,388

(22) Filed: May 15, 2020

(65) Prior Publication Data
US 2020/0305102 A1    Sep. 24, 2020

Related U.S. Application Data

(63) Continuation of application No. PCT/CN2018/111002, filed on Oct. 19, 2018.

(30) Foreign Application Priority Data

Nov. 17, 2017    (CN) .......................... 201711149026.2

(51) Int. Cl.
*H04W 56/00* (2009.01)
*H04L 1/1607* (2023.01)
(Continued)

(52) U.S. Cl.
CPC ......... *H04W 56/001* (2013.01); *H04L 1/1614* (2013.01); *H04L 27/2673* (2013.01); *H04W 72/0453* (2013.01); *H04W 76/27* (2018.02)

(58) Field of Classification Search
CPC ............... H04W 56/001; H04W 76/27; H04W 72/0453; H04L 1/1614; H04L 27/2673
See application file for complete search history.

(56) References Cited

U.S. PATENT DOCUMENTS

2013/0235837 A1*  9/2013  Suo ................ H04L 5/0062
                                                   370/329
2014/0050206 A1*  2/2014  Seo ................ H04J 11/0069
                                                   370/336
(Continued)

FOREIGN PATENT DOCUMENTS

CN    200987166 Y    12/2007
CN    103379072 A    10/2013
(Continued)

OTHER PUBLICATIONS

LG Electronics Inc., "RMSI delivery and CORESET configuration", 3GPP TSG RAN WG1 Meeting 90bis, R1-1717927, Prague, CZ, Oct. 9-13, 2017, 6 pages.

(Continued)

*Primary Examiner* — Kibrom T Hailu
*Assistant Examiner* — Robert Ma
(74) *Attorney, Agent, or Firm* — Slater Matsil, LLP

(57) ABSTRACT

This application provides a communication method and a communications device. The method includes: determining configuration information of a plurality of synchronization signal blocks located at different frequency domain positions on one carrier, where the configuration information indicates configuration parameters of the plurality of synchronization signal blocks, the configuration parameter comprises configuration pattern indication information, and the configuration pattern indication information indicates synchronization signal blocks actually sent; and sending the configuration information to a terminal device.

17 Claims, 8 Drawing Sheets

(51) Int. Cl.
*H04L 27/26* (2006.01)
*H04W 72/0453* (2023.01)
*H04W 76/27* (2018.01)

(56) References Cited

U.S. PATENT DOCUMENTS

| | | | |
|---|---|---|---|
| 2016/0021632 A1 | 1/2016 | Sun et al. | |
| 2019/0028984 A1 | 1/2019 | Lee et al. | |
| 2019/0178976 A1* | 6/2019 | Xiong | G01S 5/0215 |
| 2019/0297560 A1* | 9/2019 | Gao | H04W 72/044 |
| 2020/0015239 A1* | 1/2020 | Guey | H04L 27/2692 |
| 2020/0137700 A1* | 4/2020 | Zhang | H04W 76/27 |
| 2020/0260393 A1* | 8/2020 | Zhang | H04W 56/001 |
| 2021/0120506 A1* | 4/2021 | Takeda | H04W 56/00 |

FOREIGN PATENT DOCUMENTS

| | | |
|---|---|---|
| CN | 104581841 A | 4/2015 |
| CN | 104883728 A | 9/2015 |
| CN | 106793058 A | 5/2017 |
| CN | 106793059 A | 5/2017 |
| CN | 106793104 A | 5/2017 |
| CN | 107079404 A | 8/2017 |
| CN | 107278383 A | 10/2017 |
| CN | 108632985 A | 10/2018 |
| EP | 3457792 A1 | 3/2019 |
| WO | 2014110928 A1 | 7/2014 |
| WO | 2017039373 A1 | 3/2017 |
| WO | 2017150889 A1 | 9/2017 |
| WO | 2017188664 A1 | 11/2017 |
| WO | 2019022930 A1 | 1/2019 |

OTHER PUBLICATIONS

Huawei et al., "Remaining issues on bandwidth part", 3GPP TSG RAN WG1 Meeting #90bis, R1-1717077, Prague, Czech Republic, Oct. 9-13, 2017, 11 pages.
Motorola Mobility et al., "SS/PBCH block based measurement in wideband carrier", 3GPP TSG RAN WG1 #90bis, R1-1718697, Prague, Czech Republic, Oct. 9-13, 2017, 2 pages.
ITL, "Discussion on remaining details of SS/PBCH block", 3GPP TSG RAN WG1 Meeting NR#3, R1-1716566, Nagoya, Japan, Sep. 18-21, 2017, 7 pages.
ZTE et al., "Remaining details of Synchronization Signal Design", 3GPP TSG RAN WG1 Meeting #90bis, R1-1717030, Prague, Czech Republic, Oct. 9-13, 2017, 6 pages.
ETRI, "Remaining details on remaining minimum system information", 3GPP TSG RAN WG1 Meeting NR#3, R1-1715757, Nagoya, Japan, Sep. 18-21, 2017, 3 pages.
Nokia et al., "On Requirements and Design of SS Burst Set and SS Block Index Indication," 3GPP TSG-RAN WG1 Meeting #88, R1-1703092, Athens, Greece, Feb. 13-17, 2017, 15 pages.
Intel Corporation, "On measurement of multiple frequency layers with gap," 3GPP TSG-RAN4 Meeting #84bis, R4-1710368, Dubrovnik, Croatia, Oct. 9-13, 2017, 3 pages.
3rd Generation Partnership Project; Technical Specification Group Radio Access Network; NR; Radio Resource Control (RRC); Protocol specification (Release 15), 3GPP TS 38.331 V0.1.0 (Oct. 2017), 42 pages.
3rd Generation Partnership Project; Technical Specification Group Radio Access Network; NR; NR and NG-RAN Overall Description; Stage 2 (Release 15), 3GPP TS 38.300 V1.2.0 (Nov. 2017), 60 pages.
MCC Support, "Final Report of 3GPP TSG RAN WG1 #89 v1.0.0," 3GPP TSG RAN WG1 Meeting #90, R1-1712031, Prague, Czech Republic, Aug. 21-25, 2017, 165 pages.
VIVO, "Discussion on Rate Matching," 3GPP TSG RAN WG1 Meeting #90, R1-1712835, Prague, Czech Republic, Aug. 21-25, 2017, 5 pages.
Huawei et al., "CSI-RS Configurations and Definitions of RSRP/RSRQ for L3 Mobility," 3GPP TSG RAN WG1 Meeting NR#3, R1-1715392, Nagoya, Japan, Sep. 18-21, 2017, 4 pages.
ASUSTeK, "Multiple SS block transmissions in a wideband carrier," 3GPP TSG RAN WG1 Meeting 90bis, R1-1717786, Prague, Czech Republic, Oct. 9-13, 2017, 3 pages.
Ericsson ,"Summary of 7.1.1 Remaining Details on Synchronization signal," SG-RAN WG1 Meeting #90bis, R1-1719146, Prague, Czech Republic, Oct. 9-13, 2017, 4 pages.
NTT DOCOMO, "Status of Studies on Physical Layer Elemental Technologies and User of High Frequency Bands in 5G", NTT DoComo Technical Journal, vol. 25, No. 3, Oct. 2017, 10 pages.
Fujitsu, "On remaining details of synchronization signal", 3GPP TSG RAN WG1 Meeting 90bis, R1-1717713, Prague, Czech Republic, Oct. 9-13, 2017, 7 pages.
ZTE et al., "Composition of SS block, burst and burst set," 3GPP TSG RAN WG1 Meeting #88bis, R1-1704358, Apr. 3-7, 2017, 10 pages, Spokane, USA.
Motorola Mobility et al., "SS block transmission in wideband CC," 3GPP TSG RAN WG1 Meeting #90, R1-1714213, Aug. 21-25, 2017, 5 pages, Prague, Czech Republic.

\* cited by examiner

COMMUNICATION METHOD AND COMMUNICATIONS DEVICE

CROSS-REFERENCE TO RELATED APPLICATIONS

This application is a continuation of International Application No. PCT/CN2018/111002, filed on Oct. 19, 2018, which claims priority to Chinese Patent Application No. 201711149026.2, filed on Nov. 17, 2017. The disclosures of the aforementioned applications are hereby incorporated by reference in their entireties.

TECHNICAL FIELD

This application relates to the communications field, and more specifically, to a communication method and a communications device.

BACKGROUND

A synchronization signal and a broadcast signal in a new radio access (NR) system are carried on a plurality of synchronization signal blocks (SS block, SSB). Each synchronization signal block may be sent through a different beam, thereby obtaining a beamforming gain, to ensure that a coverage distance of the synchronization signal and a coverage distance of the broadcast signal meet a design requirement. As defined in the NR system, a synchronization signal burst set (SS burst set) includes one or more SS blocks. The SS burst set is sent periodically.

In the NR system, for a wideband carrier, sending a plurality of SS blocks at different frequency domain positions of one carrier is supported. A network device does not transmit downlink data to a terminal at a resource position at which an SS block is sent. Therefore, when performing rate matching, the terminal device needs to know an actual accurate position at which an SS block is sent. However, in a wideband scenario, SS blocks located at different frequency positions may have different configurations. Therefore, how the terminal device learns of a transmitted synchronization signal block to improve communication efficiency of a system becomes a technical problem to be solved urgently.

SUMMARY

This application provides a communication method and a communications device, to improve communication efficiency of a system.

According to a first aspect, a communication method is provided, including: determining configuration information of a plurality of synchronization signal blocks located at different frequency domain positions, where the configuration information indicates configuration parameters of the plurality of synchronization signal blocks; and sending the configuration information to a terminal device.

In the technical solution in this embodiment of the present invention, the configuration information is sent to the terminal device, to directly indicate and determine the plurality of synchronization signal blocks, thereby improving communication efficiency of a system.

In some possible implementations, the configuration parameter includes at least one of time domain position information, frequency domain position information, a period, and synchronization signal block transmission pattern information.

In some possible implementations, the sending the configuration information to a terminal device includes: sending the configuration information through a system message and/or radio resource control signaling.

In some possible implementations, the configuration information includes first configuration information and second configuration information, the first configuration information indicates one part of the configuration parameters of the plurality of synchronization signal blocks, and the second configuration information indicates the other part of the configuration parameters of the plurality of synchronization signal blocks.

In some possible implementations, the first configuration information indicates common configuration parameters of the plurality of synchronization signal blocks, and the common configuration parameters are configuration parameters that are of the plurality of synchronization signal blocks and that are the same or have a same characteristic; and the second configuration information indicates non-common configuration parameters of the plurality of synchronization signal blocks, and the non-common configuration parameters are configuration parameters that are of the plurality of synchronization signal blocks and that are different and/or have no same characteristic.

In some possible implementations, the sending the configuration information to a terminal device includes: sending the first configuration information to the terminal device through a first message; and sending the second configuration information to the terminal device through a second message.

In some possible implementations, the first message is a system message or radio resource control signaling, and the second message is radio resource control signaling or a system message.

In some possible implementations, the second configuration information includes an absolute value of a non-common configuration parameter of each of the plurality of synchronization signal blocks; or the second configuration information includes an offset value of a non-common configuration parameter of each of the plurality of synchronization signal blocks relative to a specific parameter; or the second configuration information includes configuration pattern indication information, and the configuration pattern indication information indicates a configuration pattern of non-common configuration parameters of a plurality of synchronization signal burst sets; and the synchronization signal burst set includes one or more synchronization signal blocks.

In some possible implementations, the specific parameter is a configuration parameter corresponding to a synchronization signal burst set to which a synchronization signal block connected to the terminal device belongs, or a corresponding parameter of a synchronization signal block connected to the terminal device, or a corresponding parameter of a specific resource.

According to a second aspect, a communication method is provided, including: receiving configuration information from a network device, where the configuration information indicates configuration parameters of a plurality of synchronization signal blocks located at different frequency domain positions; and determining the plurality of synchronization signal blocks based on the configuration information.

In the technical solution in this embodiment of the present invention, the configuration information from the network device is received, to directly determine the plurality of synchronization signal blocks, thereby improving communication efficiency of a system.

In some possible implementations, the configuration parameter includes at least one of time domain position information, frequency domain position information, a period, and synchronization signal block transmission pattern information.

In some possible implementations, the receiving configuration information from a network device includes: receiving, through a system message and/or radio resource control signaling, the configuration information from the network device.

In some possible implementations, the configuration information includes first configuration information and second configuration information, the first configuration information indicates one part of the configuration parameters of the plurality of synchronization signal blocks, and the second configuration information indicates the other part of the configuration parameters of the plurality of synchronization signal blocks.

In some possible implementations, the first configuration information indicates common configuration parameters of the plurality of synchronization signal blocks, and the common configuration parameters are configuration parameters that are of the plurality of synchronization signal blocks and that are the same or have a same characteristic; and the second configuration information indicates non-common configuration parameters of the plurality of synchronization signal blocks, and the non-common configuration parameters are configuration parameters that are of the plurality of synchronization signal blocks and that are different and/or have no same characteristic.

In some possible implementations, the receiving configuration information from a network device includes: receiving, through a first message, the first configuration information from the network device; and receiving, through a second message, the second configuration information from the network device.

In some possible implementations, the first message is a system message or radio resource control signaling, and the second message is radio resource control signaling or a system message.

In some possible implementations, the second configuration information includes an absolute value of a non-common configuration parameter of each of the plurality of synchronization signal blocks; or the second configuration information includes an offset value of a non-common configuration parameter of each of the plurality of synchronization signal blocks relative to a specific parameter; or the second configuration information includes configuration pattern indication information, and the configuration pattern indication information indicates a configuration pattern of non-common configuration parameters of the plurality of synchronization signal burst sets; and the synchronization signal burst set includes one or more synchronization signal blocks.

In some possible implementations, the specific parameter is a configuration parameter corresponding to a synchronization signal burst set to which a synchronization signal block connected to the terminal device belongs, or a corresponding parameter of a synchronization signal block connected to the terminal device, or a corresponding parameter of a specific resource.

According to a third aspect, a communications device is provided. The communications device includes a processor and a transceiver, and can implement the method according to any one of the foregoing aspects or the possible implementations of the foregoing aspects.

According to a fourth aspect, a communications device is provided. The communications device has a function of implementing actions of the network device in the foregoing method designs. The function may be implemented through hardware, or may be implemented by hardware by executing corresponding software. The hardware or software includes one or more modules corresponding to the foregoing function.

In some possible implementations, a structure of the network device includes a processor and a transmitter. The processor is configured to support the network device in performing corresponding functions in the foregoing methods. The transmitter is configured to: support communication between the network device and a terminal device, and send information or an instruction in the foregoing method to the terminal device. The network device may further include a memory. The memory is configured to be coupled to the processor, and the memory stores a program instruction and data that are necessary for the network device.

According to a fifth aspect, a communications device is provided. The communications device has a function of implementing actions of the terminal device in the foregoing method designs. The function may be implemented through hardware, or may be implemented by hardware by executing corresponding software. The hardware or software includes one or more modules corresponding to the foregoing function.

In some possible implementations, a structure of the terminal device includes a processor and a transmitter. The processor is configured to support the terminal device in performing corresponding functions in the foregoing methods. The transmitter is configured to: support communication between the terminal device and a network device or a terminal device, and send information or an instruction in the foregoing methods. The terminal device may further include a memory. The memory is configured to be coupled to the processor, and the memory stores a program instruction and data that are necessary for the terminal device.

According to a sixth aspect, a computer storage medium is provided. The computer storage medium stores program code, and the program code may be used to instruct to perform the method according to any one of the first aspect, the second aspect, or any possible implementation thereof.

According to a seventh aspect, a computer program product including an instruction is provided. When the computer program product is run on a computer, the computer is enabled to perform the method according to the first aspect, the second aspect, or any possible implementation thereof.

According to an eighth aspect, this application provides a system chip. The system chip includes an input/output interface, at least one processor, at least one memory, and a bus. The at least one memory is configured to store an instruction, and the at least one processor is configured to invoke the instruction in the at least one memory, to perform operations of the communication method according to the first aspect or the second aspect.

DETAILED DESCRIPTION OF ILLUSTRATIVE EMBODIMENTS

The following describes technical solutions of this application with reference to accompanying drawings.

Figure 1:
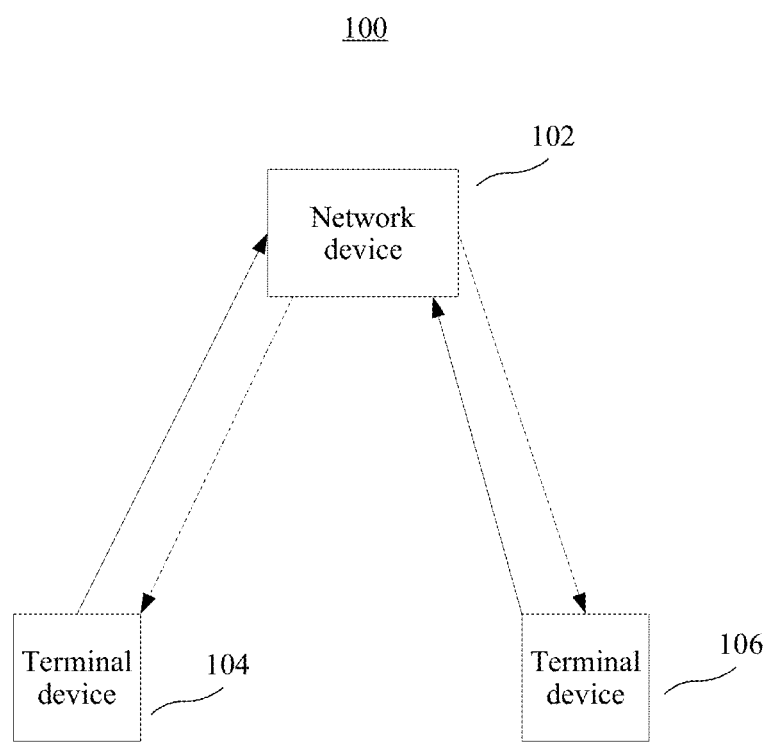
FIG. 1 is a schematic flowchart of a communication method according to an embodiment of the present invention.

FIG. 1 is a schematic diagram of a system to which embodiments of the present invention are applied. As shown in FIG. 1, a system 100 may include a network device 102 and terminal devices 104 and 106. The network device is wirelessly connected to the terminal devices. It should be understood that FIG. 1 shows an example in which the system includes only one network device for description. However, the embodiments of the present invention are not limited thereto. For example, the system may also include more network devices; and similarly, the system may also include more terminal devices. It should be further understood that the system may also be referred to as a network. This is not limited in the embodiments of the present invention.

A communications device in the embodiments of the present invention may be a terminal device. The terminal device may also be user equipment (UE), an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN), or the like.

As an example instead of a limitation, in the embodiments of the present invention, the terminal device may also be a wearable device. The wearable device may also be referred to as a wearable intelligent device, and is a generic term of wearable devices such as glasses, gloves, watches, clothing, and shoes that are developed by performing intelligent design on daily wear through a wearable technology. The wearable device is a portable device directly worn on a body or integrated into clothes or an accessory of a user. The wearable device is more than a hardware device, and implements powerful functions through software support, data interaction, and cloud interaction. In a broad sense, wearable intelligent devices include a large-sized device, for example, a smartwatch or smart glasses, that provide comprehensive functions and that can implement all or some functions independent of a smartphone; and include a device, for example, various types of smart bands and smart jewelry for body feature monitoring, that is intended for only a specific type of application function and that needs to be used in cooperation with another device such as a smartphone.

The communications device in the embodiments of the present invention may be a network device. The network device may be a device for communicating with a terminal device. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in a long term evolution (LTE) system, or may be a radio controller in a cloud radio access network (CRAN) scenario. Also, the network device may be a relay station, an access point, a vehicle-mounted device, a wearable device, a network device in a future 5G network, a network device in a future evolved PLMN, or the like.

In addition, in the embodiments of the present invention, the network device provides a service for a cell, and the terminal device communicates with the network device through a transmission resource (for example, a frequency domain resource, namely, a spectrum resource) used in the cell. The cell may be a cell corresponding to the network device (for example, a base station). The cell may belong to a macro base station or may belong to a base station corresponding to a small cell. The small cell herein may include a metro cell, a micro cell, a pico cell, a femto cell, and the like. These cells are characterized by a small coverage area, low transmit power, and the like, and are suitable for providing a high-rate data transmission service. In addition, the cell may be a hyper cell.

Figure 2:
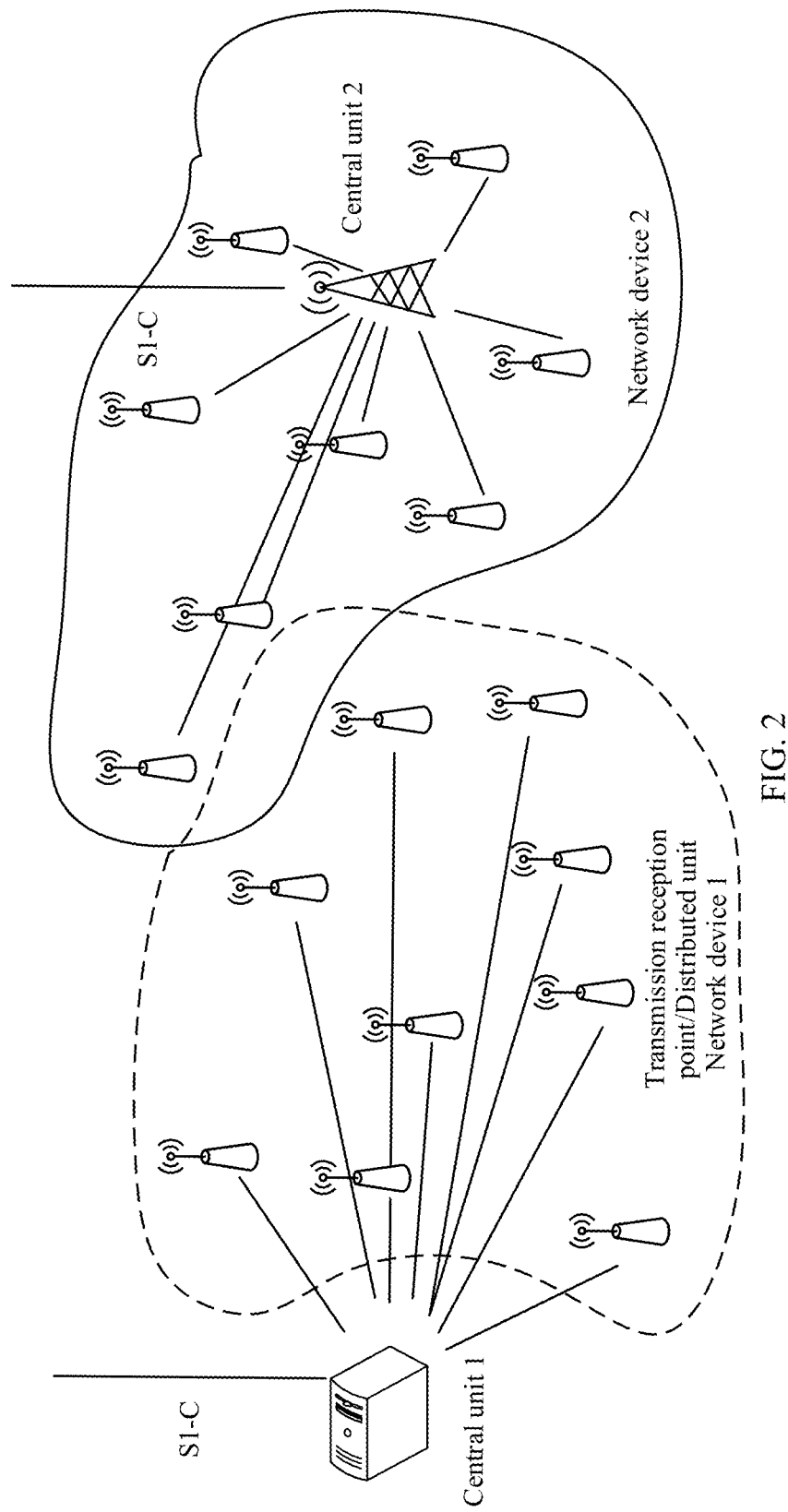
FIG. 2 is a schematic diagram of a network architecture according to an embodiment of the present invention.

FIG. 2 is a schematic diagram of an example of a network architecture that may be applied to the embodiments of the present invention. The schematic diagram of the network architecture may be an architectural diagram of a new radio access network in a next-generation wireless communications system. In the schematic diagram of the network architecture, a network device may be divided into one centralized unit (CU) and a plurality of transmission reception points (TRP)/distributed units (DU). In other words, a bandwidth based unit (BBU) of the network device is reconstructed as a DU functional entity and a CU functional entity. It should be noted that forms and quantities of central units and TRPs/DUs constitute no limitation on the embodiments of the present invention. Although a network device 1 and a network device 2 shown in FIG. 2 respectively correspond to different forms of central units, functions of the network device 1 and the network device 2 are not affected. It may be understood that a central unit 1 and TRPs/DUs in a dashed line range are composing elements of the network device 1, a central unit 2 and TRPs/DUs in a solid line range are composing elements of the network device 2, and the network device 1 and the network device 2 are network devices (or referred to as base stations) in an NR system.

The CU has a radio upper-layer protocol stack function, for example, a radio resource control (RRC) layer and a packet data convergence protocol (PDCP) layer, and can even support some core network functions in sinking to an access network. The access network is termed an edge computing network. The access network can meet a higher network latency requirement of an emerging service such as video, online shopping, and virtual/augmented reality for a future communications network.

The DU mainly has a physical layer function and a layer 2 function with a relatively high real-time requirement. In consideration of transmission resources of a radio remote unit (RRU) and the DU, some physical layer functions of the DU may be deployed on the RRU. With miniaturization of the RRU, more radically, the DU may be combined with the RRU.

CUs may be deployed in a centralized manner. DUs are deployed based on an actual network environment. In an area with relatively high traffic density, a relatively small inter-site distance, and limited equipment room resources, for example, a core urban area, a university, and a large-scale performance venue, DUs may also be deployed in a centralized manner. However, in an area with relatively low traffic density and a relatively large inter-site distance, for example, a suburb and a mountainous area, DUs may be deployed in a distributed manner.

An example interface S1-C shown in FIG. 2 may be a standard interface between a network device and a core network, and a specific device connected to S1-C is not shown in FIG. 2.

Figure 3:
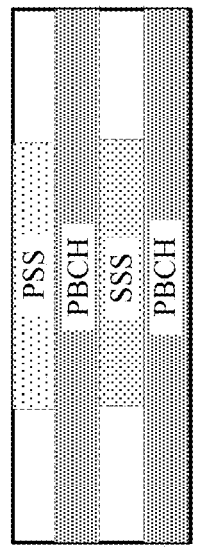
FIG. 3 is a schematic structural diagram of a synchronization signal block according to an embodiment of the present invention.

FIG. 3 is a schematic structural diagram of a synchronization signal block according to an embodiment of the present invention. It should be understood that FIG. 3 is merely an example, and constitutes no limitation on this embodiment of the present invention.

As shown in FIG. 3, synchronization signals include a primary synchronization signal (PSS) and a secondary synchronization signal (SSS), and may form one SSB together with a physical broadcast channel (PBCH). In other words, an NR primary synchronization signal (NR-PSS), an NR secondary synchronization signal (NR-SSS), and an NR physical broadcast channel (NR-PBCH) are sent on one SSB. For brevity, the NR-PSS, the NR-SSS, and the NR-PBCH on the synchronization signal block may be respectively referred to as a PSS, an SSS, and a PBCH briefly.

In addition, one or more SSBs may constitute one synchronization signal burst set (SS burst set), and the SS burst set is sent periodically. In other words, a network device sends an SSB by sending an SS burst set periodically, and each SS burst set includes one or more SSBs.

It should be understood that names of the synchronization signal block and the synchronization signal burst set are not limited in this embodiment of the present invention. In other words, the synchronization signal block and the synchronization signal burst set may be expressed as other names. For example, the synchronization signal block may also be expressed as an SSB or an SS block/a PBCH block.

The synchronization signal burst set may include one or more synchronization signal blocks. In other words, the synchronization signal burst may be understood as a synchronization signal block of a different granularity. Therefore, the synchronization signal block and the synchronization signal burst have a same or similar characteristic. Technical solutions in this embodiment of this application are suitable for both the synchronization signal block and the synchronization signal burst set. Specific implementations of a communication method in this application are described below through the synchronization signal burst set as an example.

Figure 4:
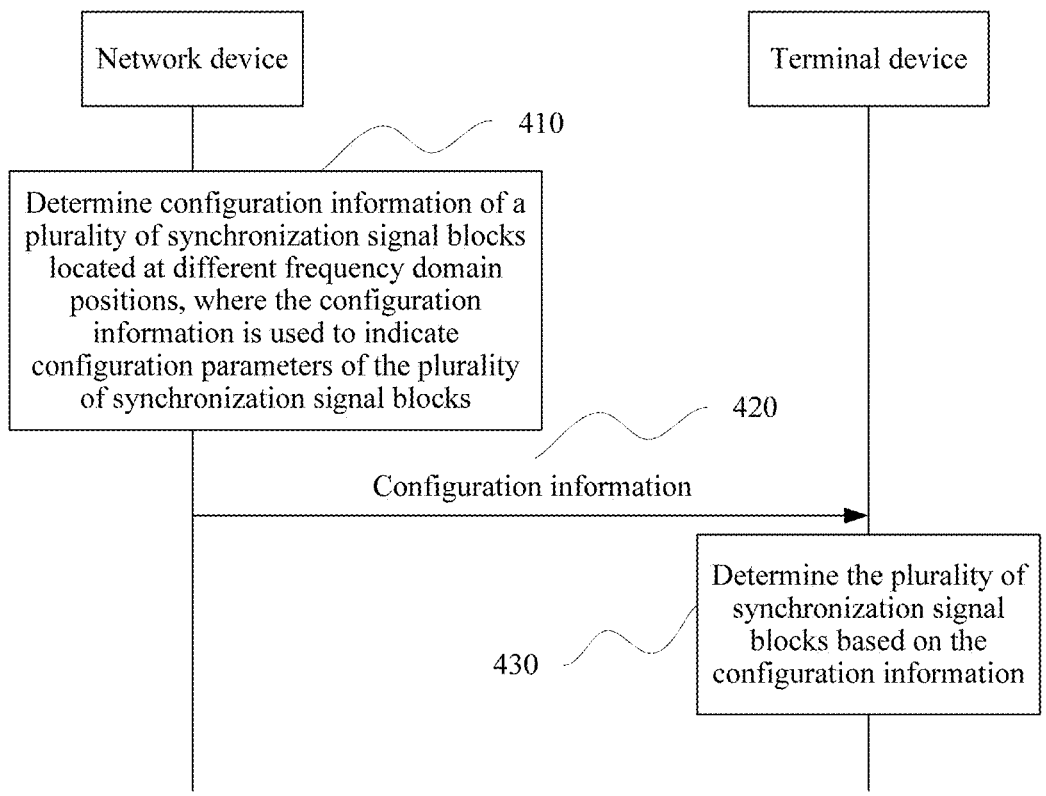
FIG. 4 is a schematic flowchart of a communication method according to an embodiment of the present invention.

FIG. 4 is a schematic flowchart of a communication method according to an embodiment of the present invention. In FIG. 4, a network device may be the network device described above, and a terminal device may be the terminal device described above. Certainly, in an actual system, a quantity of network devices and a quantity of terminal devices may not be limited to an example in this embodiment or in another embodiment. Details are not described below again. The communication method shown in FIG. 4 may be applied to a wideband (wideband) scenario. A wideband may include one wideband carrier. To be specific, there are a plurality of SSBs (SSB burst set) at different frequency domain positions of one wideband carrier. Also, a wideband may be a wideband obtained by aggregating one or more carriers. Also, the wideband may include one or more sub-bands in other forms. This is not limited in this embodiment of this application.

The communication method shown in FIG. 4 may include step 410, step 420, and step 430.

Step 410: The network device determines configuration information of a plurality of synchronization signal burst sets located at different frequency domain positions, where the configuration information indicates configuration parameters of the plurality of synchronization signal burst sets.

In the wideband scenario, synchronization signal burst sets may be sent at different frequency domain positions. For example, a wideband carrier may include a plurality of sub-bands, and a synchronization signal burst set may be sent on each sub-band.

In this embodiment of this application, when the plurality of synchronization signal burst sets are sent at the different frequency domain positions, the configuration information of the plurality of synchronization signal burst sets is configured for the terminal device, to indicate the configuration parameters of the plurality of synchronization signal burst sets. Each synchronization signal burst set includes at least one synchronization signal block. Particularly, when the synchronization signal burst set includes a plurality of synchronization signal blocks, the plurality of synchronization signal blocks may further include additional SSBs. For a specific terminal device, the additional SSBs are SSBs other than a synchronization signal block initially accessed (camp on) by the UE in the plurality of synchronization signal blocks.

In this embodiment of this application, optionally, the configuration parameter of the synchronization signal burst set may include at least one of time domain position information, frequency domain position information, a period, and synchronization signal block transmission pattern (pattern) information.

The time domain position information indicates a transmission moment of the synchronization signal burst set, for example, a system frame number (SFN) or a half-frame indicator corresponding to the synchronization signal burst set. This is not limited in this embodiment of this application.

The frequency domain position information indicates a frequency domain position of the synchronization signal burst set, for example, a resource block (RB) or a resource block group (RBG) on which the synchronization signal burst set located. This is not limited in this embodiment of this application.

The period is a period in which the synchronization signal burst set is sent periodically.

The synchronization signal block transmission pattern information indicates an actually sent synchronization signal block in the synchronization signal burst set. For example, a form of a bitmap may be used.

In this embodiment of this application, optionally, the configuration information of the synchronization signal burst sets may include first configuration information and second configuration information. The first configuration information may be used to indicate one part of the configuration parameters of the plurality of synchronization signal burst sets, and the second configuration information may be used to indicate the other part of the configuration parameters of the plurality of synchronization signal burst sets.

Optionally, in an embodiment of this application, the first configuration information may be used to indicate common configuration parameters of the plurality of synchronization signal burst sets, and the common configuration parameters may be configuration parameters that are of the plurality of synchronization signal burst sets and that are the same or have a same characteristic; and the second configuration information may be used to indicate non-common configuration parameters of the plurality of synchronization signal burst sets, and the non-common configuration parameters may be configuration parameters that are of the plurality of synchronization signal burst sets and that are different and/or have no same characteristic.

In this embodiment of this application, configuration parameters having a same characteristic indicate that a plurality of configuration parameters may be indicated through same information. For example, if a plurality of configuration parameters have a same offset, the offset may be used to indicate the plurality of configuration parameters. In this case, the plurality of configuration parameters are configuration parameters having a same characteristic. Also, if a plurality of configuration parameters are a predetermined pattern, indication information of the pattern may be used to indicate the plurality of configuration parameters. In this case, the plurality of configuration parameters are also configuration parameters having a same characteristic.

Particularly, when the configuration parameters of the synchronization signal burst sets are all the same or have a same characteristic, all the configuration parameters are common configuration parameters. In other words, in this case, there is no second configuration information. When the configuration parameters of the synchronization signal burst sets are all different and/or have no same characteristic, all the configuration parameters are non-common configuration parameters. In other words, in this case, there is no first configuration information.

Optionally, in an embodiment of this application, the second configuration information may include an absolute value of a non-common configuration parameter of each of the plurality of synchronization signal blocks; or the second configuration information may include an offset value of a non-common configuration parameter of each of the plurality of synchronization signal blocks relative to a specific parameter; or the second configuration information may include configuration pattern indication information, and the configuration pattern indication information indicates a configuration pattern of non-common configuration parameters of the plurality of synchronization signal burst sets.

Specifically, the second configuration information needs to indicate the non-common configuration parameter of each synchronization signal burst set. When a plurality of parameters are indicated together, a manner in which an absolute value of each parameter is indicated may be used, a manner in which an offset value is indicated may be used, or a manner in which a pattern of the plurality of parameters is indicated may be used. This is not limited in this embodiment of this application.

Figure 5:
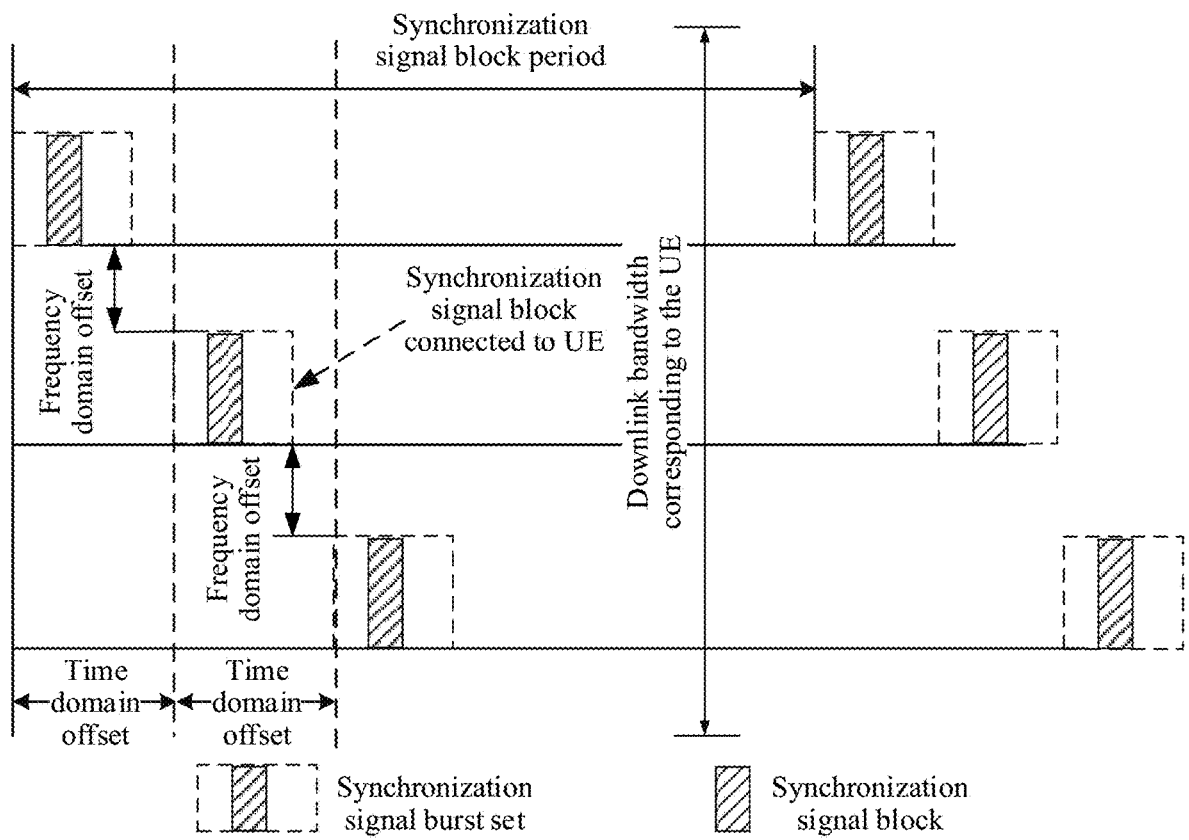
FIG. 5 is a schematic diagram of common configuration information according to an embodiment of the present invention.

FIG. 5 is a schematic diagram of common configuration information according to an embodiment of the present invention. It should be understood that FIG. 5 is merely an example, and constitutes no limitation on this embodiment of the present invention.

In an embodiment of this application, when the first configuration information includes time domain position information, the time domain position information is a common configuration parameter. It may be understood that absolute time domain positions of the plurality of synchronization signal burst sets are the same, for example, it may indicate that the absolute time domain positions of the plurality of synchronization signal burst sets are aligned. In this case, a common absolute time domain position of the plurality of synchronization signal burst sets is common time domain position information. Also, it may be understood that the plurality of synchronization signal burst sets have a same time domain position characteristic.

Specifically, as shown in FIG. 5, when there is a same time domain offset between any two synchronization signal burst sets that are adjacent in frequency domain, the time domain offset may be used to indicate the time domain position information. Also, when time domain distribution or time domain offset information of the plurality of synchronization signal burst sets satisfies a predetermined pattern, indication information of the pattern may be used to indicate the time domain position information.

In an embodiment of this application, when the first configuration information includes frequency domain position information, the frequency domain position information is a common configuration parameter. It may be understood that relative positions of the plurality of synchronization signal burst sets are the same in frequency domain. Also, it may be understood that the plurality of synchronization signal burst sets have a same frequency domain position characteristic, that is, there is a same frequency domain offset between any two synchronization signal burst sets that are adjacent in frequency domain, or frequency domain distribution of the plurality of synchronization signal burst sets is indicated through a predefined pattern.

Optionally, as shown in FIG. 5, when there is a same frequency domain offset between any two synchronization signal burst sets, the frequency domain offset may be used to indicate the frequency domain position information. Also, when frequency domain distribution or frequency domain offset information of the plurality of synchronization signal burst sets satisfies a predetermined pattern, indication information of the pattern may be used to indicate the frequency domain position information.

In an embodiment of this application, when the first configuration information includes a period, the period is a common configuration parameter. It may be understood that periods of sending the plurality of synchronization signal blocks are the same.

In an embodiment of this application, when the first configuration information includes synchronization signal block transmission pattern information, the synchronization signal block transmission pattern information is a common configuration parameter. It may be understood that actually sent synchronization signal blocks in the plurality of synchronization signal burst sets are at a same frequency domain position. Also, it may be understood that actually sent synchronization signal blocks in the plurality of synchronization signal burst sets have a same offset relative to a specific resource block, or frequency domain distribution of the plurality of synchronization signal burst sets is indicated through a predefined pattern.

Optionally, the first configuration information may include at least one of the time domain position information, the frequency domain position information, the period, and the synchronization signal block transmission pattern information.

Optionally, when the second configuration information includes time domain position information, the time domain position information is a non-common configuration parameter. For example, the second configuration information may indicate absolute time domain position information of each synchronization signal burst set, and the time domain position information may be one or a combination of a system frame number, a half-frame indicator, and the like of each synchronization signal burst set.

Optionally, the second configuration information may also indicate the time domain offset information of the plurality of synchronization signal burst sets. The time domain offset information may indicate information about a time domain offset of each synchronization signal burst set relative to a reference point, where a time domain position at which a synchronization signal block connected to the terminal device is located is used as the reference point, or a specific system frame, for example, a subframe o of the system frame is used as the reference point. One or a combination of a slot, a frame, a millisecond, a preset time window, and the like may be used as a basic unit of the time domain offset information. This is not limited in this application.

Optionally, the second configuration information may also indicate one or more predefined patterns of the plurality of synchronization signal burst sets, and the pattern may indicate distribution of the plurality of synchronization signal burst sets at time domain positions.

In an embodiment of this application, when the second configuration information includes only the time domain position information, the network device may send the first configuration information to the terminal device through a system message, and send the second configuration information to the terminal device through radio resource control signaling.

Optionally, in this embodiment of this application, the system message may be remaining minimum system information (RMSI) or other system information (OSI).

Figure 6:
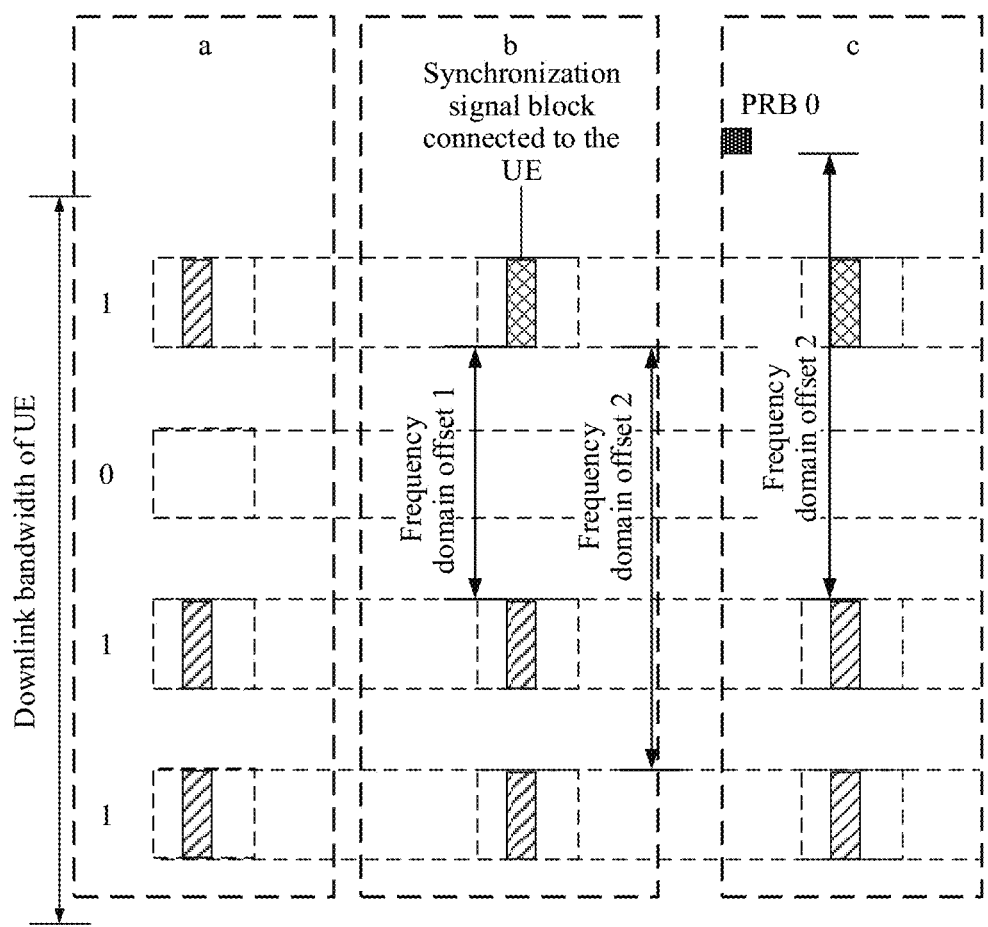
FIG. 6 is a schematic diagram of different frequency domain position information according to an embodiment of the present invention.

FIG. 6 is a schematic diagram of different frequency domain position information according to an embodiment of the present invention. It should be understood that FIG. 6 is merely an example, and constitutes no limitation on this embodiment of the present invention.

In this embodiment of this application, when the second configuration information includes frequency domain position information, the frequency domain position information is a non-common configuration parameter. For example, the second configuration information may indicate absolute frequency domain position information of each synchronization signal burst set, and the frequency domain position information may be indicated based on one or a combination of a resource block, a resource block group, a synchronization signal grid, and the like on which the synchronization signal burst set is located. The synchronization signal grid is a frequency domain unit obtained by dividing a frequency domain resource at a granularity other than a resource block or a resource block group. This is not limited in this application.

Optionally, as shown in a part a in FIG. 6, the second configuration information may also indicate frequency domain position information of each synchronization signal burst set through a bitmap. The bitmap includes a plurality of bits, and the bits correspond to a plurality of frequency domain positions, and indicate whether there is a synchronization signal burst set at the corresponding frequency domain positions. For example, "1" may be used to indicate that there is a synchronization signal burst set at a frequency domain position corresponding to the bit, and "0" indicates that there is no synchronization signal burst set at a frequency domain position corresponding to the bit. The frequency domain position information may be indicated based on one or a combination of a resource block, a resource block group, a synchronization signal grid, and the like on which the synchronization signal burst set is located.

Optionally, as shown in a part b in FIG. 6 and a part c in FIG. 6, the second configuration information may also indicate frequency domain offset information of the plurality of synchronization signal burst sets. The frequency domain offset information may indicate information about a frequency domain offset of each synchronization signal burst set relative to a reference position, where a frequency domain position at which a synchronization signal block connected to the terminal device is located is used as the reference position, or a specific resource block, for example, a resource block o is used as the reference position. The frequency domain position information may be indicated based on one or a combination of a resource block, a resource block group, a synchronization signal grid, and the like on which the synchronization signal burst set is located. The synchronization signal grid is a frequency domain unit obtained by dividing a frequency domain resource at a granularity other than a resource block or a resource block group. This is not limited in this application.

Optionally, the second configuration information may also indicate frequency domain distribution of the plurality of synchronization signal burst sets through a predefined pattern.

In an embodiment of this application, when the second configuration information includes only the frequency domain position information, the network device may send the first configuration information to the terminal device through a system message, and send the second configuration information to the terminal device through radio resource control signaling.

In an embodiment of this application, when the second configuration information includes a period, the period is a non-common configuration parameter, and the second configuration information may indicate a period of each synchronization signal burst set located at a different frequency domain position. The period of each synchronization signal burst set may be a period in which the synchronization signal burst set is sent periodically.

In an embodiment of this application, when the second configuration information includes only the period, the network device may send the first configuration information to the terminal device through a system message, and send the second configuration information to the terminal device through radio resource control signaling.

In an embodiment of this application, when the second configuration information includes synchronization signal block transmission pattern information, the synchronization signal block transmission pattern information is a non-common configuration parameter, and the second configuration information may also indicate synchronization signal block transmission pattern information of each synchronization signal burst set through a bitmap. The bitmap includes a plurality of bits, and the bits respectively correspond to the synchronization signal burst sets located at different frequency domain positions, and indicate the synchronization signal block transmission pattern information corresponding to each synchronization signal burst set.

Optionally, the second configuration information may also indicate the plurality of synchronization signal burst sets through an inter-group bitmap and an intra-group bitmap. For example, one synchronization signal burst set may include a maximum of 64 synchronization signal blocks. The 64 synchronization signal blocks may be divided into eight synchronization signal block groups, and the eight synchronization signal block groups correspond to eight inter-group bitmaps. Each group includes eight synchronization signal blocks, and the eight synchronization signal blocks correspond to eight intra-group bitmaps. A corresponding bit in a corresponding bitmap indicates whether there is a synchronization signal block group or a synchronization signal block transmitted. N synchronization signal burst sets located at different frequency domain positions need to correspond to N inter-group bitmaps and N intra-group bitmaps, where N is a positive integer.

Figure 7:
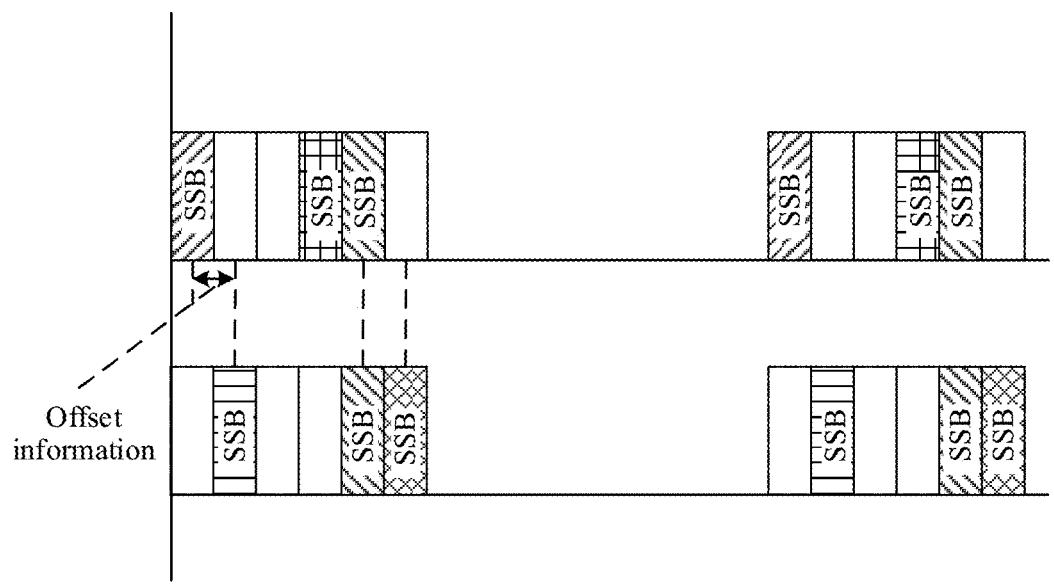
FIG. 7 is a schematic diagram of offset information in synchronization signal block transmission pattern information according to an embodiment of the present invention.

FIG. 7 is a schematic diagram of offset information in synchronization signal block transmission pattern information according to an embodiment of the present invention. It should be understood that FIG. 7 is merely an example, and constitutes no limitation on this embodiment of the present invention.

Optionally, as shown in FIG. 7, the second configuration information may also indicate offset information of synchronization signal block transmission pattern information of the plurality of synchronization signal burst sets. The offset information may indicate information about an offset of each synchronization signal burst set relative to a reference position, where a frequency domain position at which a synchronization signal block connected to the terminal device is located is used as the reference position, or a specific resource block, for example, a resource block o is used as the reference position. One or a combination of a synchronization signal block, a modulation/demodulation symbol, and the like may be used as a basic unit of the offset information. This is not limited in this application.

Optionally, the second configuration information may also indicate synchronization signal block transmission pattern information of the plurality of synchronization signal burst sets through a predefined structure.

In an embodiment of this application, when the second configuration information includes only the synchronization signal block transmission pattern information, the network device may send the first configuration information to the terminal device through a system message, and send the second configuration information to the terminal device through radio resource control signaling.

Optionally, in an embodiment of this application, the second configuration information may include at least one of the frequency domain position information, the time domain position information, the period, and the synchronization signal block transmission pattern information. Correspondingly, the first configuration information includes at least one of configuration parameters that are not included in the second configuration information. The network device sends the first configuration information to the terminal device through a system message, and sends the second configuration information to the terminal device through radio resource control signaling.

Optionally, when the second configuration information includes the time domain position information, the second configuration information may indicate absolute time domain position information of each synchronization signal burst set or time domain offset information of the plurality of synchronization signal burst sets; when the second configuration information includes the frequency domain position information, the second configuration information may indicate absolute frequency domain position information of each synchronization signal burst set, frequency domain offset information of the plurality of synchronization signal burst sets, or a predefined pattern; and when the second configuration information includes the synchronization signal block transmission pattern information, the second configuration information may indicate offset information of each synchronization signal block transmission pattern information or a predefined structure.

For example, when the second configuration information includes the frequency domain position information and the time domain position information, and the first configuration information may include the period and the synchronization signal block transmission pattern information, the network device may send the first configuration information to the terminal device through a system message, and send the second configuration information to the terminal device through radio resource control signaling.

Similarly, when the second configuration information includes the frequency domain position information and the synchronization signal block transmission pattern information, and the first configuration information may include the time domain position information and the period, the network device may send the first configuration information to the terminal device through a system message, and send the second configuration information to the terminal device through radio resource control signaling.

In the various embodiments described above, the terminal device obtains and determines the first configuration information through the system message, and obtains and determines the second configuration information through the radio resource control signaling.

Step 420: The network device sends the configuration information to the terminal device. Correspondingly, the terminal device receives the configuration information.

Optionally, in an embodiment of this application, the network device may send the configuration information to the terminal device through the system message and/or the radio resource control signaling. The system message may be remaining minimum system information or other system information.

Optionally, in an embodiment of this application, the network device may send the first configuration information to the terminal device through a first message, and the network device may send the second configuration information to the terminal device through a second message.

Optionally, in an embodiment of this application, the first message may be a system message or radio resource control signaling, and the second message may be radio resource control signaling or a system message.

For example, in an embodiment of this application, the first configuration information may include at least one of the frequency domain position information, the period, and the synchronization signal block transmission pattern information, and the second configuration information may include the time domain position information. The network device may send the first configuration information to the terminal device through the system message, and send the second configuration information to the terminal device through the radio resource control signaling.

Optionally, the first configuration information may include at least one of the time domain position information, the period, and the synchronization signal block transmission pattern information, and the second configuration information may include the frequency domain position information. The network device may send the first configuration information to the terminal device through the system message, and send the second configuration information to the terminal device through the radio resource control signaling.

Optionally, the first configuration information may include at least one of the frequency domain position information, the time domain position information, and the synchronization signal block transmission pattern information, and the second configuration information may include the period. The network device may send the first configuration information to the terminal device through the system message, and send the second configuration information to the terminal device through the radio resource control signaling.

Optionally, the first configuration information may include at least one of the frequency domain position information, the time domain position information, and the period, and the second configuration information may include the synchronization signal block transmission pattern information. The network device may send the first configuration information to the terminal device through the system message, and send the second configuration information to the terminal device through the radio resource control signaling.

Optionally, in an embodiment of this application, the second configuration information may include at least one of the frequency domain position information, the time domain position information, the period, and the synchronization signal block transmission pattern information. Correspondingly, the first configuration information may include at least one of configuration parameters that are not included in the second configuration information. The network device may send the first configuration information to the terminal device through the system message, and send the second configuration information to the terminal device through the radio resource control signaling.

Optionally, in an embodiment of this application, the second configuration information may include at least one of the frequency domain position information, the time domain position information, the period, and the synchronization signal block transmission pattern information. Correspondingly, the first configuration information may include at least one of configuration parameters that are not included in the second configuration information. The network device may send the first configuration information to the terminal device through the radio resource control signaling, and send the second configuration information to the terminal device through the radio resource control signaling.

Optionally, in an embodiment of this application, the second configuration information may include at least one of the frequency domain position information, the time domain position information, the period, and the synchronization signal block transmission pattern information. Correspondingly, the first configuration information may include at least one of configuration parameters that are not included in the second configuration information. The network device may send the first configuration information to the terminal device through the system message, and send the second configuration information to the terminal device through the system message.

Optionally, the second configuration information includes at least one of the frequency domain position information, the time domain position information, the period, and the synchronization signal block transmission pattern information. Correspondingly, the first configuration information includes configuration parameters that are not included in the second configuration information. The network device may send the first configuration information to the terminal device through the system message or the radio resource control signaling, and send the second configuration information to the terminal device through the system message or the radio resource control signaling.

Optionally, the first configuration information includes at least one of the frequency domain position information, the time domain position information, the period, and the synchronization signal block transmission pattern information. The network device may send the first configuration information to the terminal device through the system message or the radio resource control signaling.

Optionally, the second configuration information includes at least one of the frequency domain position information, the time domain position information, the period, and the synchronization signal block transmission pattern information. The network device may send the second configuration information to the terminal device through the system message or the radio resource control signaling.

Optionally, in this embodiment of this application, the configuration information includes at least one of the frequency domain position information, the time domain position information, the period, and the synchronization signal block transmission pattern information. The network device may send the configuration information to the terminal device through the system message or the radio resource control signaling.

In the various embodiments described above, the terminal device receives and obtains the first configuration information through the system message or the radio resource control signaling, and receives and obtains the second configuration information through the system message or the radio resource control signaling.

Step 430: The terminal device determines the configuration parameters of the plurality of synchronization signal burst sets based on the configuration information.

The terminal device receives the configuration information from the network device, and obtains the configuration parameters in the configuration information, so that synchronization signal blocks of the plurality of synchronization signal burst sets can be directly determined.

Optionally, the configuration information may include first configuration information and second configuration information. The first configuration information may be used to indicate one part of the configuration parameters of the plurality of synchronization signal burst sets, and the second configuration information may be used to indicate the other part of the configuration parameters of the plurality of synchronization signal burst sets.

Optionally, the first configuration information may be used to determine common configuration parameters of the plurality of synchronization signal burst sets, and the second configuration information may be used to determine non-common configuration parameters of the plurality of synchronization signal burst sets.

Specifically, the configuration parameter of the synchronization signal burst set may include at least one of time domain position information, frequency domain position information, a period, and synchronization signal block transmission pattern information.

Optionally, the terminal device may receive, through a system message and/or radio resource control signaling, the configuration information from the network device. This is not limited in this embodiment of this application.

Optionally, the terminal device may receive, through the system message or the radio resource control signaling, the first configuration information from the network device, and receive, through the system message or the radio resource control signaling, the second configuration information from the network device.

In other words, the terminal device may receive, through the system message or the radio resource control signaling, the configuration information from the network device.

In the foregoing embodiment of this application, the network device may indicate the configuration information of the synchronization signal burst set to the terminal device in an explicit indication manner or an implicit indication manner. For example, if the explicit indication manner is used, the network device may indicate the configuration information to the terminal device through a reserved field or a specific field in the system message or the radio resource control signaling, or may indicate the configuration information to the terminal device in a predefined manner or a manner specified in a protocol. It should be understood that these manners are only used as examples for description in this application, but this embodiment of this application is not limited thereto. For example, the network device may also indicate the configuration information through other indication information in a piggyback manner. Similarly, the network device may also indicate the configuration information to the terminal device by predefining meanings of different values of a specific field. It should be further understood that all other methods that may be used to indicate the information may be used as embodiments of this application. This is not limited in this embodiment of this application.

Figure 8:
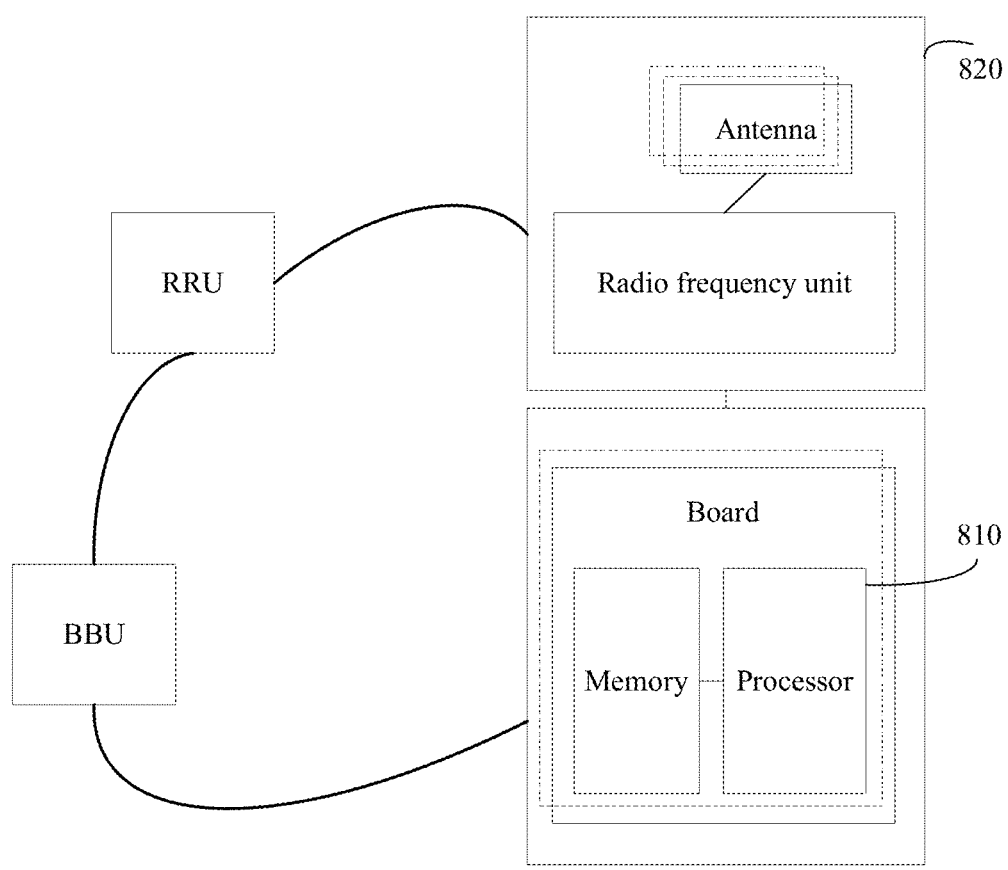
FIG. 8 is a schematic diagram of a communications device according to an embodiment of this application.

FIG. 8 is a schematic diagram of a communications device according to an embodiment of this application. The communications device may correspond to the network device in the method embodiments, and may have any function of the network device in the method.

As shown in FIG. 8, the communications device includes a processor 810 and a transceiver 820.

Optionally, the transceiver 820 may be referred to as a remote radio unit (RRU), a transceiver unit, a transceiver, a transceiver circuit, or the like. The transceiver 820 may include at least one antenna and a radio frequency unit. The transceiver 820 may be configured to: receive and send a radio frequency signal, and perform conversion between the radio frequency signal and a baseband signal.

Optionally, the communications device may include a baseband unit (BBU), and the baseband unit includes the processor 810. The baseband unit may be configured to: perform baseband processing such as channel coding, multiplexing, modulation, or spectrum spreading, and control the network device. The transceiver 820 and the baseband unit may be physically disposed together, or may be physically disposed separately. In other words, the communications device is a distributed network device.

In an example, the baseband unit may include one or more boards, and the plurality of boards may jointly support a radio access network of a single access standard, or may respectively support radio access networks of different access standards.

In an example, the baseband unit may be reconstructed as the foregoing DU functional entity and the foregoing CU functional entity.

The baseband unit includes the processor 810. The processor 810 may be configured to control the communications device to perform corresponding operations in the foregoing method embodiments. Optionally, the baseband unit may further include a memory, and the memory is configured to store a necessary instruction and necessary data.

In an embodiment of this application, the processor 810 is configured to determine configuration information of a plurality of synchronization signal burst sets located at different frequency domain positions. The configuration information indicates configuration parameters of the plurality of synchronization signal burst sets.

The transceiver 820 is configured to send the configuration information to a terminal device.

Optionally, the configuration parameter includes at least one of time domain position information, frequency domain position information, a period, and synchronization signal block transmission pattern information.

Optionally, the transceiver 820 is further configured to send the configuration information through a system message and/or radio resource control signaling.

Optionally, the configuration information includes first configuration information and second configuration information. The first configuration information indicates one part of the configuration parameters of the plurality of synchronization signal burst sets, and the second configuration information indicates the other part of the configuration parameters of the plurality of synchronization signal burst sets.

Optionally, the first configuration information indicates common configuration parameters of the plurality of synchronization signal burst sets, and the common configuration parameters are configuration parameters that are of the plurality of synchronization signal burst sets and that are the same or have a same characteristic; and the second configuration information indicates non-common configuration parameters of the plurality of synchronization signal burst sets, and the non-common configuration parameters are configuration parameters that are of the plurality of synchronization signal burst sets and that are different and/or have no same characteristic.

The transceiver 820 is further configured to: send the first configuration information to the terminal device through a first message, and send the second configuration information to the terminal device through a second message.

Optionally, the first message is a system message or radio resource control signaling, and the second message is radio resource control signaling or a system message.

Optionally, the second configuration information includes an absolute value of a non-common configuration parameter of each of the plurality of synchronization signal blocks; or the second configuration information includes an offset value of a non-common configuration parameter of each of the plurality of synchronization signal blocks relative to a specific parameter; or the second configuration information includes configuration pattern indication information, and the configuration pattern indication information indicates a configuration pattern of non-common configuration parameters of the plurality of synchronization signal burst sets.

Optionally, the specific parameter is a configuration parameter corresponding to a synchronization signal burst set to which a synchronization signal block connected to the terminal device belongs, or a corresponding parameter of a synchronization signal block connected to the terminal device, or a corresponding parameter of a specific resource.

Figure 9:
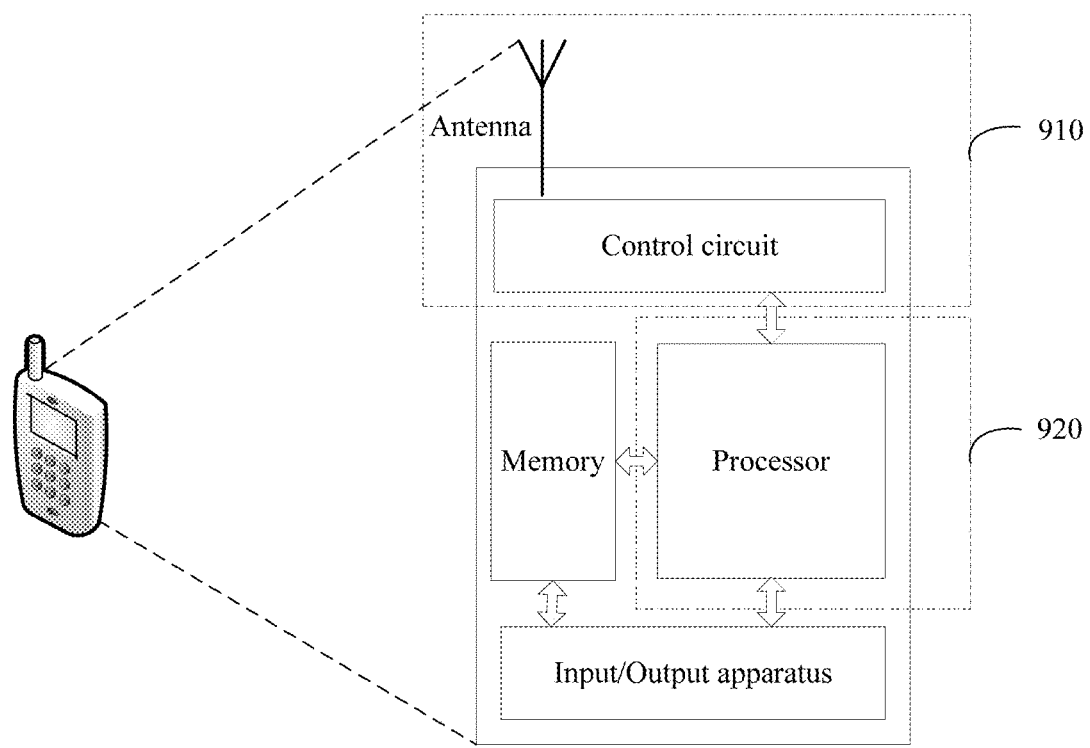
FIG. 9 is a schematic diagram of a communications device according to another embodiment of this application.

FIG. 9 is a schematic diagram of a communications device according to another embodiment of this application. It should be understood that FIG. 9 is merely an example, and constitutes no limitation on this embodiment of the present invention.

The communications device may correspond to the terminal device in the method embodiments, and may have any function of the terminal device in the method.

As shown in FIG. 9, the communications device includes a transceiver 910 and a processor 920.

Optionally, the transceiver 910 may include a control circuit and an antenna. The control circuit may be configured to: perform conversion between a baseband signal and a radio frequency signal, and process the radio frequency signal. The antenna may be configured to receive and send a radio frequency signal.

Optionally, the communications device may further include another main component of the terminal device, for example, a memory or an input/output apparatus.

The processor 920 may be configured to: process a communications protocol and communication data, control the entire communications device, execute a software program, and process data of the software program, for example, supporting the communications device in performing a corresponding operation in the foregoing method embodiments. The memory is mainly configured to store a software program and data. After the communications device is powered on, the processor 920 may read the software program in the memory, interpret and execute an instruction of the software program, and process data of the software program.

In an embodiment of this application, the transceiver 910 is configured to receive configuration information from a network device. The configuration information indicates configuration parameters of a plurality of synchronization signal burst sets located at different frequency domain positions.

The processor 920 is configured to determine synchronization signal blocks of the plurality of synchronization signal burst sets based on the configuration information.

Optionally, the configuration parameter may include at least one of time domain position information, frequency domain position information, a period, and synchronization signal block transmission pattern information.

Optionally, the transceiver 910 is specifically configured to send the configuration information through a system message and/or radio resource control signaling.

Optionally, the configuration information may include first configuration information and second configuration information. The first configuration information indicates one part of the configuration parameters of the plurality of synchronization signal burst sets, and the second configuration information indicates the other part of the configuration parameters of the plurality of synchronization signal burst sets.

Optionally, the first configuration information indicates common configuration parameters of the plurality of synchronization signal burst sets, and the common configuration parameters are configuration parameters that are of the plurality of synchronization signal burst sets and that are the same or have a same characteristic; and the second configuration information indicates non-common configuration parameters of the plurality of synchronization signal burst sets, and the non-common configuration parameters are configuration parameters that are of the plurality of synchronization signal burst sets and that are different and/or have no same characteristic.

Optionally, the transceiver 910 is specifically configured to: send the first configuration information to the terminal device through a first message, and send the second configuration information to the terminal device through a second message.

Optionally, the first message is a system message or radio resource control signaling, and the second message is radio resource control signaling or a system message.

Optionally, the second configuration information includes an absolute value of a non-common configuration parameter of each of the plurality of synchronization signal blocks; or the second configuration information includes an offset value of a non-common configuration parameter of each of the plurality of synchronization signal blocks relative to a specific parameter; or the second configuration information includes configuration pattern indication information, and the configuration pattern indication information indicates a configuration pattern of non-common configuration parameters of the plurality of synchronization signal burst sets.

Optionally, the specific parameter is a configuration parameter corresponding to a synchronization signal burst set to which a synchronization signal block connected to the terminal device belongs, or a corresponding parameter of a synchronization signal block connected to the terminal device, or a corresponding parameter of a specific resource.

An embodiment of the present invention further provides a processing apparatus, including a processor and an interface.

The processor is configured to perform the method in the foregoing embodiments of the present invention.

The processing apparatus may be a chip. The processor may be implemented through hardware or may be implemented through software. When the processor is implemented through hardware, the processor may be a logic circuit, an integrated circuit, or the like. When the processor is implemented through software, the processor may be a general purpose processor, and is implemented by reading software code stored in a memory. The memory may be integrated into the processor, or may be located outside the processor and exist independently.

The processing apparatus may be a field-programmable gate array (FPGA), may be an application-specific integrated circuit (ASIC), may be a system on chip (SoC), may be a central processing unit (CPU), may be a network processor (NP), may be a digital signal processor (DSP), may be a micro control unit (MCU), or may be a programmable logic device (PLD) or another integrated chip.

An embodiment of the present invention further provides a communications device, including a processing unit and a transceiver unit. The processing unit and the transceiver unit may be implemented through software or may be implemented through hardware. When being implemented through hardware, the processing unit may be the processor 810 in FIG. 8, and the transceiver unit may be the transceiver 820 in FIG. 8; or the processing unit may be the processor 920 in FIG. 9, and the transceiver unit may be the transceiver 910 in FIG. 9.

An embodiment of the present invention further provides a communications system, including the foregoing network device and the foregoing terminal device.

All or some of the foregoing embodiments may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that, the term "and/or" in this embodiment of the present invention describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a terminal device or a chip for the terminal device, comprising:
   receiving configuration information from a network device; wherein the configuration information comprises a plurality of configuration parameters of a plurality of synchronization signal blocks, the plurality of synchronization signal blocks comprising different synchronization signal block bursts located at different frequency domain positions, each configuration parameter of the plurality of configuration parameters comprises respective transmission pattern information, each respective transmission pattern information indicates actually transmitted synchronization signal blocks in a synchronization signal block burst, and wherein each respective transmission pattern information is a bitmap; and
   determining the actually transmitted synchronization signal blocks based on the configuration information; and
   wherein, for each respective transmission pattern information, the bitmap of the respective transmission pattern information includes a plurality of bits, and each bit indicates whether there is a synchronization signal block at a position corresponding to the bit; and
   wherein each configuration parameter of the plurality of configuration parameters further comprises a period for a synchronization signal block of the plurality of synchronization signal blocks that corresponds to the respective configuration parameter.

2. The method according to claim 1, wherein the configuration information is received through radio resource control signaling.

3. The method according to claim 1, wherein each configuration parameter of the plurality of configuration parameters further comprises:
   an absolute value of a frequency domain position of the synchronization signal block of the plurality of synchronization signal blocks that corresponds to the respective configuration parameter; or
   an offset value of a frequency domain position of the synchronization signal block of the plurality of synchronization signal blocks corresponding to the respective configuration parameter relative to a specific parameter.

4. The method according to claim 1, wherein each configuration parameter of the plurality of configuration parameters further comprises time domain position information of the synchronization signal block of the plurality of synchronization signal blocks that corresponds to the respective configuration parameter.

5. An apparatus, comprising:
a storage medium including executable instructions; and
a processor; wherein the executable instructions, when executed by the processor, cause the apparatus to:
receive configuration information from a network device, wherein the configuration information comprises a plurality of configuration parameters of a plurality of synchronization signal blocks, the plurality of synchronization signal blocks comprising different synchronization signal block bursts located at different frequency domain positions, each configuration parameter of the plurality of configuration parameters comprises respective transmission pattern information, each respective transmission pattern information indicates actually transmitted synchronization signal blocks in a synchronization signal block burst, and wherein each respective transmission pattern information is a bitmap; and
determining the actually transmitted synchronization signal blocks based on the configuration information; and
wherein, for each respective transmission pattern information, the bitmap of the respective transmission pattern information includes a plurality of bits, each bit of the plurality of bits indicates whether there is a synchronization signal block at a position corresponding to the bit, and each configuration parameter of the plurality of configuration parameters further comprises a period for a synchronization signal block of the plurality of synchronization signal blocks that corresponds to the respective configuration parameter.

6. The apparatus according to claim 5, wherein the configuration information is received through radio resource control signaling.

7. The apparatus according to claim 5, wherein each configuration parameter of the plurality of configuration parameters further comprises:
an absolute value of a frequency domain position of the synchronization signal block of the plurality of synchronization signal blocks that corresponds to the respective configuration parameter; or
an offset value of a frequency domain position of the synchronization signal block of the plurality of synchronization signal blocks that corresponds to the respective configuration parameter relative to a specific parameter.

8. The apparatus according to claim 5, wherein each configuration parameter of the plurality of configuration parameters further comprises time domain position information of a synchronization signal block of the plurality of synchronization signal blocks that corresponds to the respective configuration parameter.

9. An apparatus, comprising:
a storage medium including executable instructions; and
a processor;
wherein the executable instructions, when executed by the processor, cause the apparatus to:
determine configuration information of a plurality of synchronization signal blocks, wherein the plurality of synchronization signal blocks comprising different synchronization signal block bursts located at different frequency domain positions, the configuration information comprises a plurality of configuration parameters of the plurality of synchronization signal blocks, each configuration parameter of the plurality of configuration parameters comprises respective transmission pattern information, and each respective transmission pattern information indicates actually transmitted synchronization signal blocks in a synchronization signal block burst, and wherein each respective transmission pattern information is a bitmap; and
send the configuration information and the actually transmitted synchronization signal blocks to a terminal device; and
wherein, for each respective transmission pattern information, the bitmap of the respective transmission pattern information includes a plurality of bits, and each bit indicates whether there is a synchronization signal block at a position corresponding to the bit, and each configuration parameter of the plurality of configuration parameters further comprises a period of a synchronization signal block of the plurality of synchronization signal blocks that corresponds to the respective configuration parameter.

10. The apparatus according to claim 9, wherein the configuration information is sent through radio resource control signaling.

11. The apparatus according to claim 9, wherein each configuration parameter of the plurality of configuration parameters further comprises:
an absolute value of a frequency domain position of the synchronization signal block of the plurality of synchronization signal blocks that corresponds to the respective configuration parameter; or
an offset value of a frequency domain position of the synchronization signal block of the plurality of synchronization signal blocks that corresponds to the respective configuration parameter relative to a specific parameter.

12. The apparatus according to claim 9, wherein each configuration parameter of the plurality of configuration parameters further comprises time domain position information of a synchronization signal block of the plurality of synchronization signal blocks that corresponds to the respective configuration parameter.

13. The method according to claim 1, further comprising:
performing rate matching according to the configuration information.

14. The apparatus according to claim 5, wherein the executable instructions, when executed by the processor, further cause the apparatus to:
perform rate matching according to the configuration information.

15. The apparatus according to claim 9, wherein the configuration information is usable for rate matching by the apparatus.

16. The method according to claim 1, wherein all of the plurality of configuration parameters are different from each other.

17. The method according to claim 1, wherein each of the plurality of configuration parameters contains at least one common characteristic.

* * * * *